United States Patent
Xu et al.

(10) Patent No.: US 10,440,610 B2
(45) Date of Patent: Oct. 8, 2019

(54) METHOD AND APPARATUS FOR OBTAINING RADIO ACCESS NETWORK SHARING INFORMATION IN WIRELESS COMMUNICATION SYSTEM

(71) Applicant: LG Electronics Inc., Seoul (KR)

(72) Inventors: Jian Xu, Seoul (KR); Kyungmin Park, Seoul (KR); Daewook Byun, Seoul (KR)

(73) Assignee: LG Electronics Inc., Seoul (KR)

( * ) Notice: Subject to any disclaimer, the term of this patent is extended or adjusted under 35 U.S.C. 154(b) by 299 days.

(21) Appl. No.: 15/106,899

(22) PCT Filed: Jan. 16, 2015

(86) PCT No.: PCT/KR2015/000466
§ 371 (c)(1),
(2) Date: Jun. 21, 2016

(87) PCT Pub. No.: WO2015/108364
PCT Pub. Date: Jul. 23, 2015

(65) Prior Publication Data
US 2018/0199236 A1    Jul. 12, 2018

Related U.S. Application Data

(60) Provisional application No. 61/928,418, filed on Jan. 17, 2014.

(51) Int. Cl.
*H04W 28/08* (2009.01)
*H04W 16/08* (2009.01)
(Continued)

(52) U.S. Cl.
CPC .......... *H04W 28/08* (2013.01); *H04W 16/08* (2013.01); *H04W 36/22* (2013.01); *H04W 48/06* (2013.01);
(Continued)

(58) Field of Classification Search
CPC ..... H04W 28/08; H04W 36/22; H04W 48/06; H04W 76/27; H04W 84/042; H04W 16/08; H04W 92/20
See application file for complete search history.

(56) References Cited

U.S. PATENT DOCUMENTS

2012/0257571 A1* 10/2012 Liao .................. H04W 4/70
370/328
2013/0286828 A1  10/2013 Cho et al.
(Continued)

FOREIGN PATENT DOCUMENTS

JP    2009-260895 A    11/2009
WO   2012/160977 A1   11/2012
(Continued)

OTHER PUBLICATIONS

International Search Report and Written Opinion issued in corresponding International Patent Application No. PCT/KR2015/000466 dated Apr. 21, 2015.

*Primary Examiner* — Walter J Divito
(74) *Attorney, Agent, or Firm* — Morgan, Lewis & Bockius LLP

(57) ABSTRACT

A method and apparatus for obtaining radio access network (RAN) sharing information in a wireless communication system is provided. For an overload procedure, an evolved NodeB (eNB), which is shared by a plurality of operators, receives an indication of overloaded operator from a mobility management entity (MME), and performs an overload action for the overloaded operator indicated by the indication. Further, for a load balancing procedure, a first eNB, which is shared by a plurality of operators, receives a status report per operator from a second eNB, which is shared by the plurality of operators, and performs a load balancing action based on the status report.

12 Claims, 15 Drawing Sheets

(51) Int. Cl.
*H04W 36/22* (2009.01)
*H04W 48/06* (2009.01)
*H04W 76/27* (2018.01)
*H04W 92/20* (2009.01)
*H04W 84/04* (2009.01)

(52) U.S. Cl.
CPC .......... *H04W 76/27* (2018.02); *H04W 84/042* (2013.01); *H04W 92/20* (2013.01)

(56) References Cited

U.S. PATENT DOCUMENTS

| | | |
|---|---|---|
| 2013/0324141 A1 | 12/2013 | Jung et al. |
| 2014/0148165 A1* | 5/2014 | Serravalle ............. H04W 16/14 455/436 |
| 2015/0045032 A1* | 2/2015 | Tomici ................. H04W 36/04 455/436 |
| 2015/0141011 A1 | 5/2015 | Jeong et al. |

FOREIGN PATENT DOCUMENTS

| | | |
|---|---|---|
| WO | 2012/093832 A2 | 12/2012 |
| WO | 2013/172623 A1 | 11/2013 |

\* cited by examiner (a)

(b)

METHOD AND APPARATUS FOR OBTAINING RADIO ACCESS NETWORK SHARING INFORMATION IN WIRELESS COMMUNICATION SYSTEM

BACKGROUND OF THE INVENTION

Field of the Invention

The present invention relates to wireless communications, and more particularly, to a method and apparatus for obtaining radio access network (RAN) sharing information in a wireless communication system.

Related Art

Universal mobile telecommunications system (UMTS) is a 3rd generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), an access point, etc. One eNB 20 may be deployed per cell.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) and a system architecture evolution (SAE) gateway (S-GW). The MME/S-GW 30 may be positioned at the end of the network and connected to an external network. For clarity, MME/S-GW 30 will be referred to herein simply as a "gateway," but it is understood that this entity includes both the MME and S-GW.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) gateway (P-GW) and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE 10 is connected to the eNB 20 via a Uu interface. The eNBs 20 are connected to each other via an X2 interface. Neighboring eNBs may have a meshed network structure that has the X2 interface. A plurality of nodes may be connected between the eNB 20 and the gateway 30 via an S1 interface.

FIG. 2 shows a block diagram of architecture of a typical E-UTRAN and a typical EPC. Referring to FIG. 2, the eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

FIG. 3 shows a block diagram of a user plane protocol stack and a control plane protocol stack of an LTE system. FIG. 3-(a) shows a block diagram of a user plane protocol stack of an LTE system, and FIG. 3-(b) shows a block diagram of a control plane protocol stack of an LTE system. Layers of a radio interface protocol between the UE and the E-UTRAN may be classified into a first layer (L1), a second layer (L2), and a third layer (L3) based on the lower three layers of the open system interconnection (OSI) model that is well-known in the communication system.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data between the MAC layer and the PHY layer is transferred through the transport channel. Between different PHY layers, i.e., between a PHY layer of a transmission side and a PHY layer of a reception side, data is transferred via the physical channel.

A MAC layer, a radio link control (RLC) layer, and a packet data convergence protocol (PDCP) layer belong to the L2. The MAC layer provides services to the RLC layer, which is a higher layer of the MAC layer, via a logical channel. The MAC layer provides data transfer services on logical channels. The RLC layer supports the transmission of data with reliability. Meanwhile, a function of the RLC layer may be implemented with a functional block inside the MAC layer. In this case, the RLC layer may not exist. The PDCP layer provides a function of header compression function that reduces unnecessary control information such that data being transmitted by employing IP packets, such as IPv4 or IPv6, can be efficiently transmitted over a radio interface that has a relatively small bandwidth.

A radio resource control (RRC) layer belongs to the L3. The RLC layer is located at the lowest portion of the L3, and is only defined in the control plane. The RRC layer controls logical channels, transport channels, and physical channels in relation to the configuration, reconfiguration, and release of radio bearers (RBs). The RB signifies a service provided the L2 for data transmission between the UE and E-UTRAN.

Referring to FIG. 3-(a), the RLC and MAC layers (terminated in the eNB on the network side) may perform functions such as scheduling, automatic repeat request (ARQ), and hybrid ARQ (HARQ). The PDCP layer (terminated in the eNB on the network side) may perform the user plane functions such as header compression, integrity protection, and ciphering.

Referring to FIG. 3-(b), the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

FIG. 4 shows an example of a physical channel structure. A physical channel transfers signaling and data between PHY layer of the UE and eNB with a radio resource. A physical channel consists of a plurality of subframes in time domain and a plurality of subcarriers in frequency domain. One subframe, which is 1 ms, consists of a plurality of symbols in the time domain. Specific symbol(s) of the subframe, such as the first symbol of the subframe, may be used for a physical downlink control channel (PDCCH). The PDCCH carries dynamic allocated resources, such as a physical resource block (PRB) and modulation and coding scheme (MCS).

A DL transport channel includes a broadcast channel (BCH) used for transmitting system information, a paging channel (PCH) used for paging a UE, a downlink shared channel (DL-SCH) used for transmitting user traffic or control signals, a multicast channel (MCH) used for multicast or broadcast service transmission. The DL-SCH supports HARQ, dynamic link adaptation by varying the modulation, coding and transmit power, and both dynamic and semi-static resource allocation. The DL-SCH also may enable broadcast in the entire cell and the use of beamforming.

A UL transport channel includes a random access channel (RACH) normally used for initial access to a cell, a uplink shared channel (UL-SCH) for transmitting user traffic or control signals, etc. The UL-SCH supports HARQ and dynamic link adaptation by varying the transmit power and potentially modulation and coding. The UL-SCH also may enable the use of beamforming.

The logical channels are classified into control channels for transferring control plane information and traffic channels for transferring user plane information, according to a type of transmitted information. That is, a set of logical channel types is defined for different data transfer services offered by the MAC layer.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting multimedia broadcast multicast services (MBMS) control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RRC state indicates whether an RRC layer of the UE is logically connected to an RRC layer of the E-UTRAN. The RRC state may be divided into two different states such as an RRC idle state (RRC_IDLE) and an RRC connected state (RRC_CONNECTED). In RRC_IDLE, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE, no RRC context is stored in the eNB.

In RRC_CONNECTED, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion. A paging message is transmitted over all cells belonging to the same tracking area. If the UE moves from one tracking area (TA) to another TA, the UE will send a tracking area update (TAU) message to the network to update its location.

Radio access network (RAN) sharing is a way for operators to share the heavy deployment costs for mobile networks, especially in the roll-out phase. In the current mobile telephony marketplace, functionality that enables various forms of RAN sharing is becoming more and more important. Multiple operators can share radio network resources and create potential requirements that complement existing system capabilities for sharing common E-UTRAN resources. A method for enhancing RAN sharing may be required.

SUMMARY OF THE INVENTION

The present invention provides a method and apparatus for obtaining radio access network (RAN) sharing information in a wireless communication system. The present invention provides a method for receiving an indication of an operator for RAN sharing, and taking corresponding actions based on the received indication.

In an aspect, a method for performing, by an evolved NodeB (eNB) which is shared by a plurality of operators, an overload procedure in a wireless communication system is provided. The method includes receiving an indication of overloaded operator from a mobility management entity (MME), and performing an overload action for the overloaded operator indicated by the indication.

The indication may indicate which operator, among the plurality of operators, is overloaded. The indication may indicate which public land mobile network (PLMN) is overloaded.

The plurality of operators may share at least one MME.

In another aspect, a method for performing, by a first evolved NodeB (eNB) which is shared by a plurality of operators, a load balancing procedure in a wireless communication system is provided. The method includes receiving a status report per operator from a second eNB, which is shared by the plurality of operators, and performing an load balancing action based on the status report.

RAN sharing can be enhanced.

DESCRIPTION OF EXEMPLARY EMBODIMENTS

Figure 1:
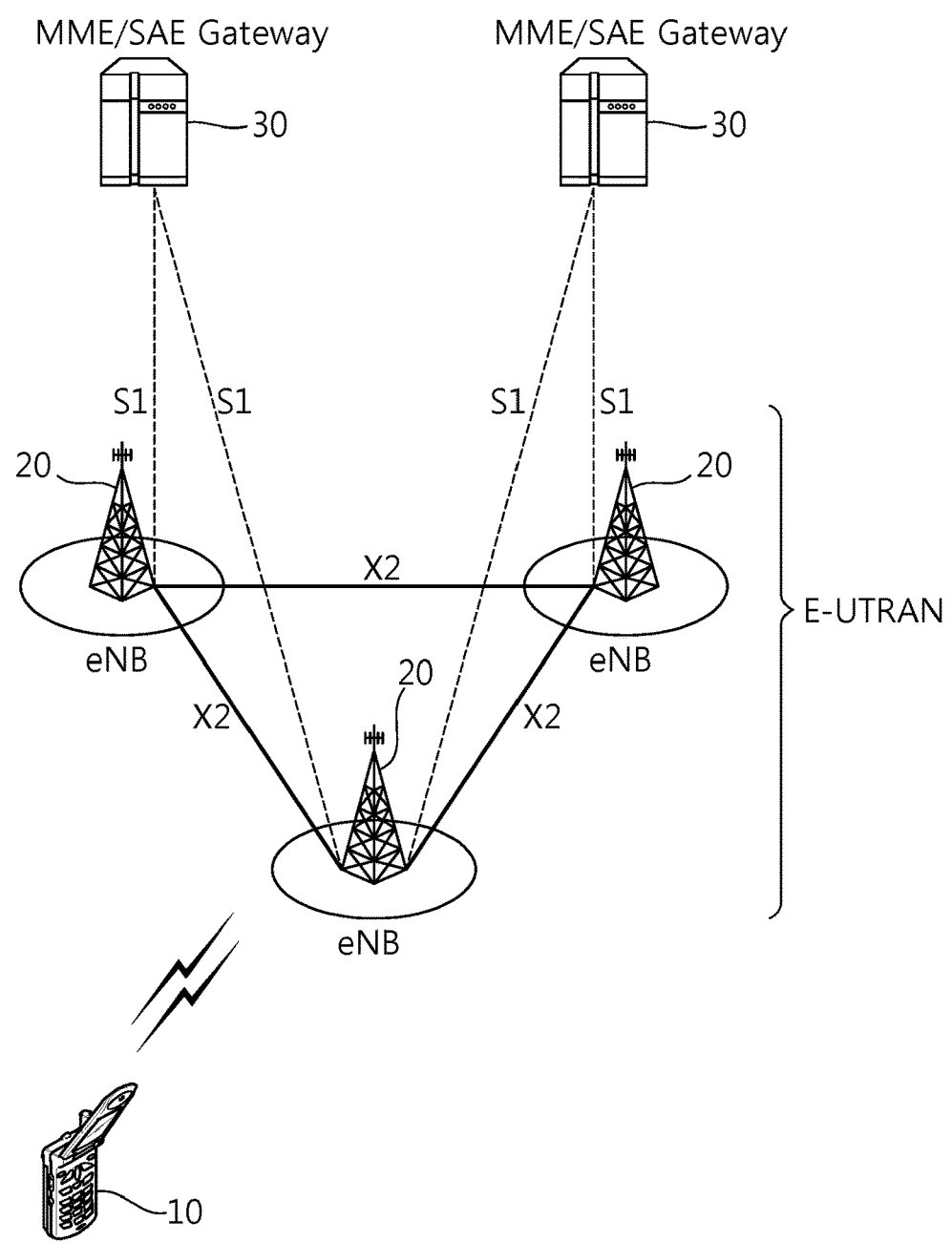
FIG. 1 shows LTE system architecture.
Figure 2:
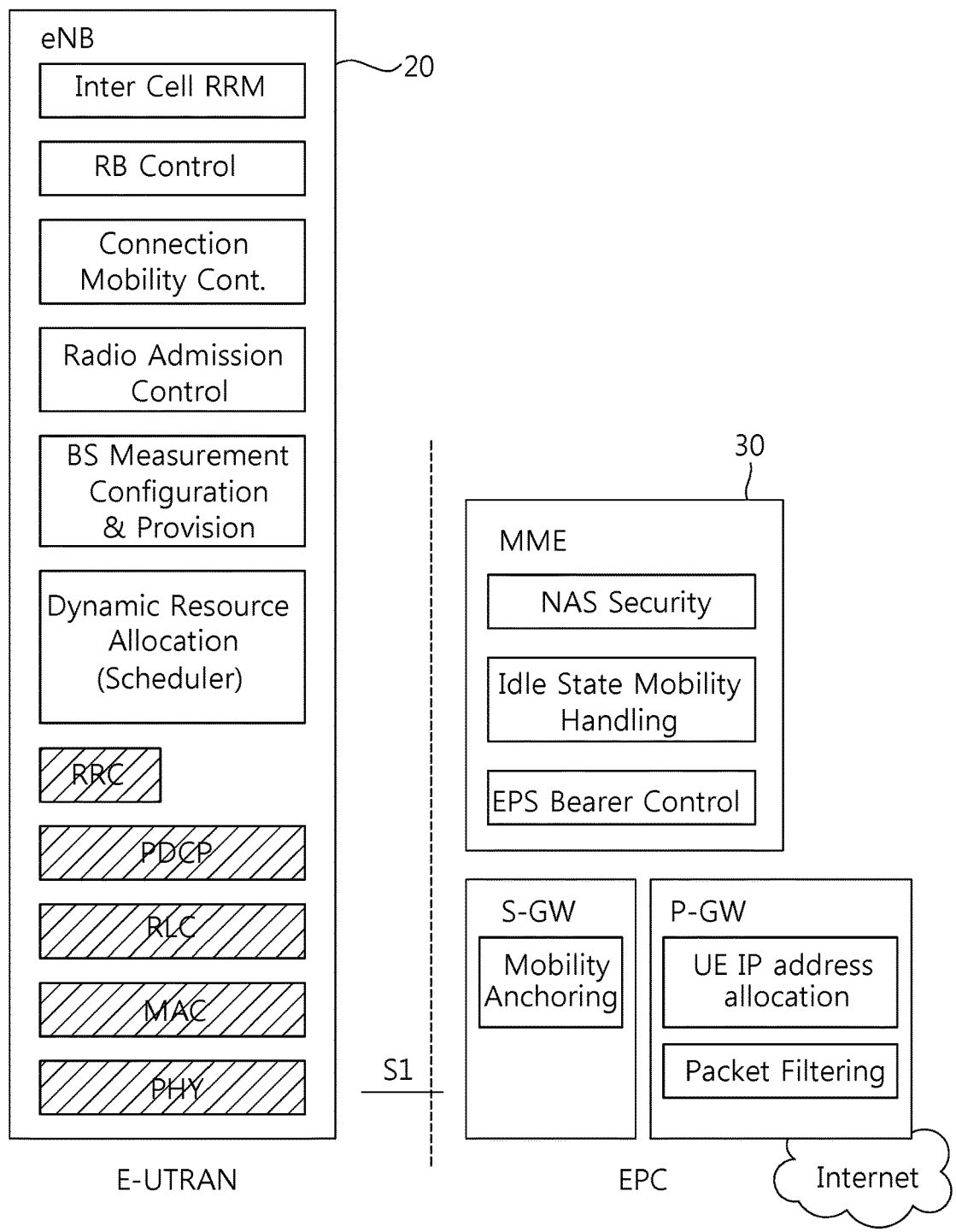
FIG. 2 shows a block diagram of architecture of a typical E-UTRAN and a typical EPC.
Figure 3:
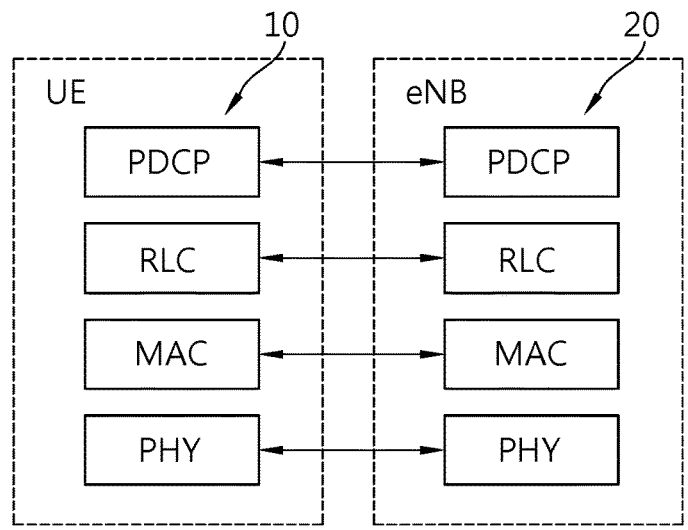
FIG. 3 shows a block diagram of a user plane protocol stack and a control plane protocol stack of an LTE system.
Figure 3:
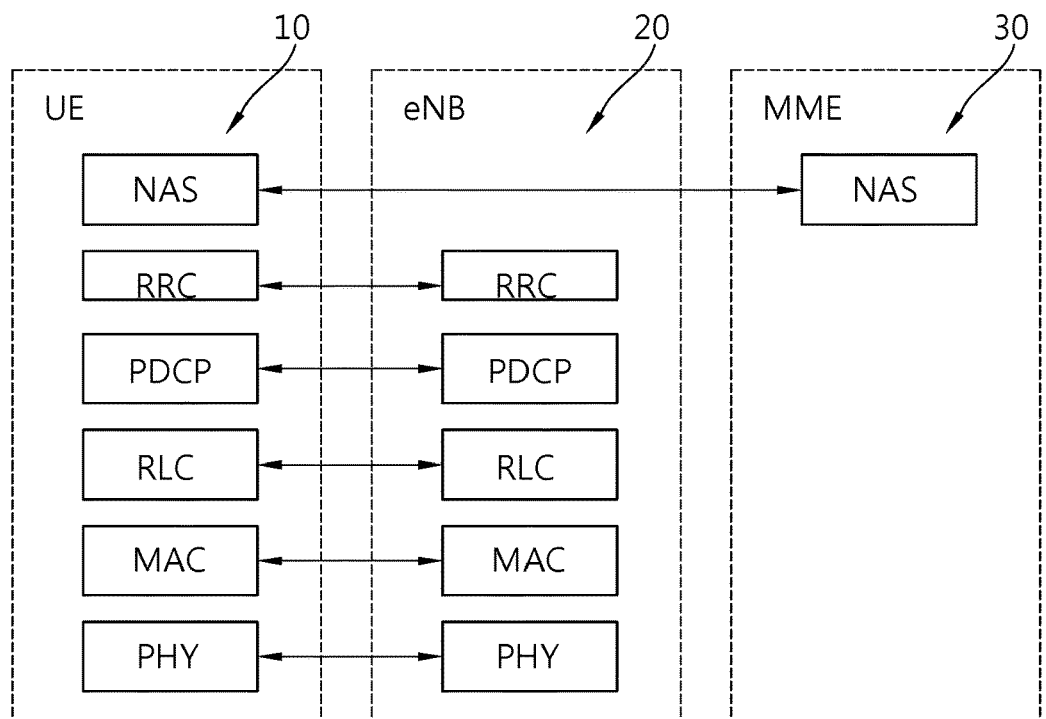
Figure 4:
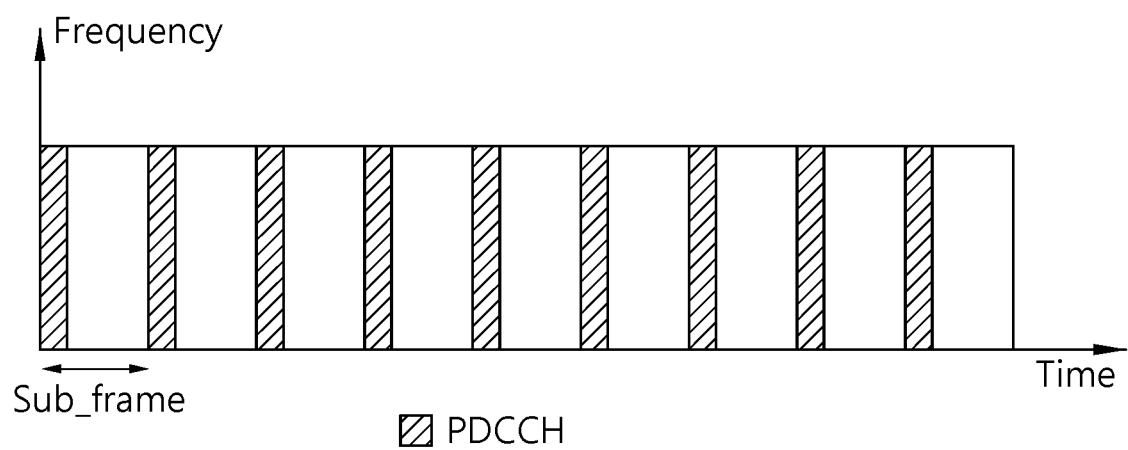
FIG. 4 shows an example of a physical channel structure.

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Radio access network (RAN) sharing is described. It may be referred to 3GPP TR 22.852 V12.0.0 (2013-06). The arrangements for RAN sharing between the involved entities can vary widely, being influenced by a number of factors including business, technical, network deployment and regulatory conditions. Within all of this variation, there is a set of common roles centered around connecting network facilities between the parties participating in RAN sharing agreement.

A hosting RAN provider is a provider of a hosting RAN. The hosting RAN provider is identified as sharing a hosting RAN with one or more participating operators. The characteristics of the hosting RAN provider include:

Has primary operational access to particular licensed spectrum which is part of the RAN sharing arrangement.

Has deployed a RAN in a specific geographic region covered under the RAN sharing arrangement Operates the RAN identified in the previous two items.

Provides facilities allowing participating operators to share the RAN covered under the RAN sharing arrangement Within the concept of the hosting RAN provider, other entities can be involved such as outsourcing, joint ventures, or leasing agreements such as for operating, owning the RAN infrastructure or managing the RAN sharing agreements.

A participating operator is an operator that uses allocated shared RAN resources provided by the hosting RAN provider under RAN sharing agreement. The participating operator is identified as using shared RAN facilities provided by the hosting RAN provider, possibly alongside other participating operators. The characteristics of the participating operator include:

Uses a portion of the particular shared licensed spectrum to provide communication services under its own control to its own subscribers.

Uses a portion of the shared RAN in the specific geographic region covered under the RAN sharing arrangement.

Within the concept of the participating operator, other entities can be involved such as outsourcing, joint ventures, or leasing agreements such as for operating or owning the service infrastructure.

Roaming and roaming agreements between operators provides a similar capability to RAN sharing where a subscriber of a home public land mobile network (HPLMN) can obtain services while roaming into a visited PLMN (VPLMN). This can be viewed as a form of sharing where the VPLMN shares the use of its RAN with the HPLMN for each HPLMN subscriber roaming into the VPLMN.

The distinction between roaming and RAN sharing is:

when roaming, the subscriber uses the VPLMN when outside of the HPLMN geographic coverage and within the VPLMN geographic coverage in a RAN sharing arrangement, all of the participants (hosting RAN provider and one or more participating operators) provide the same geographic coverage through the hosting RAN.

Operators can take on multiple roles at the same time depending on business needs. It may be assumed that each specific network set (spectrum-region-RAN) can be considered independently and combined with other network sets in various combinations. Examples include:

An operator has its own spectrum which is not shared and additionally uses the shared RAN in the same region (participating operator) provided by the hosting RAN provider.

Two operators set up a joint venture to build and operate a shared network. The two operators are both participating operators and the joint venture is the hosting RAN provider.

Two operators A&B, divide a region covered by a joint spectrum license and each build and operate the RAN in their portion of the region. In the region covered by operator A's RAN, operator A is the hosting RAN provider and at the same time the participating operator while operator B is only the participating operator. In the region covered by operator B's RAN, operators A and B are the participating operators and operator B is the hosting RAN provider.

The hosting RAN provider may share E-UTRAN resources with participating operators in various ways. It is assumed that at least a set of radio base stations (RBS) are shared for use by participating operators. The RAN sharing agreement between the hosting RAN provider and participating operators may or may not include sharing of a part of the radio spectrum of the hosting RAN provider. For example, a mobile virtual network operator (MVNO) as a participating operator would use the spectrum provided by the hosting RAN provider. Further, the sharing of core network (CN) nodes, while not excluded, is not considered.

Typically, RAN sharing arises out of the following situations:

A greenfield deployment—two operators jointly agree to build out a new technology (typically 4G). At the outset, the new shared network infrastructure and operations can be based on capacity and coverage requirements of both operators. The operator can, e.g., fund built-on 50:50 or according to their expected needs.

Buy-in—when one of the sharing operator has already built (4G for example) and looking for another operator to share this network. In this case, the second operator would typically either pay a capacity usage fee or up-front fee to acquire in the network.

Various scenarios and use cases have been discussed for RAN sharing. One of scenarios and use cases for RAN sharing is load balancing in shared RAN. This use case describes the situation of a certain shared coverage area consisting of several cells, which are shared by multiple operators. The agreed shares are predefined among these operators. In this case, load balancing between these cells needs to take the network sharing ratio per operator into account.

One example is described for load balancing in shared RAN. For example, pre-conditions may be set as follows. Two neighboring cells (A and B) are shared by operator 1 and 2. Two neighboring cells (C and D) are shared by operator 1 and 2. Cell A and B does not overlap with cell C and D. Operator 1 is allowed to use 30% of cell capacity of A and B, and operator 2 is allowed to use 70% of cell capacity of A and B. Operator 1 is allowed to use 30% of cell capacity of C and D, and operator 2 is allowed to use 70% of cell capacity of C and D. Further, load status of cells and usage per PLMN prior to load balancing is assumed to be as follows:

Cell A is 40% loaded (60% spare): 31% used by operator 1/9% used by operator 2

Cell B is 50% loaded (50% spare): 20% used by operator 1/30% used by operator 2

Cell C is 90% loaded (10% spare): 31% used by operator 1/59% used by operator 2

Cell D is 30% loaded (70% spare): 10% used by operator 1/20% used by operator 2

In the situation above, service flows may be as follows. Although the ratio of operator 1 exceeds 30% in cell A, the whole load of cell A (40%) is very light. In addition, the total percentage used by operator 1 in Cell A and B does not exceed 30%. The 1% additional radio resource usage of operator 1 exceeding his guaranteed use of 30% cell capacity in cell A is allowed and will not trigger operator 1's load balancing towards cell B. In other words, when cell A is lightly loaded, even though operator 1's usage exceeds his guaranteed cell capacity, load balancing towards cell B is not necessary. This is mainly to avoid unnecessary load balancing behaviour, e.g., handover operator 1's subscribers from cell A to cell B would result in more risks on network performance, e.g., increasing call drop rate or handover failures.

In case of cell C and D, not only does the ratio of operator 1 exceed 30%, but also the overall cell C load is very high (90%). Load balancing has to be triggered to offload cell C's traffic to cell D by exchanging cell load information between these affected cells. Since operator 1 exceeds the ratio of predefined usage ratio, traffic from operator 1 would be handed over to cell D, until the maximal usage limit of operator 1 has been reached. After that, traffic from operator 1 and operator 2 will be offloaded to cell D to achieve further load balancing between the cells while trying to keep usage ratio of both operators proportional to their relative shares.

Figure 5:
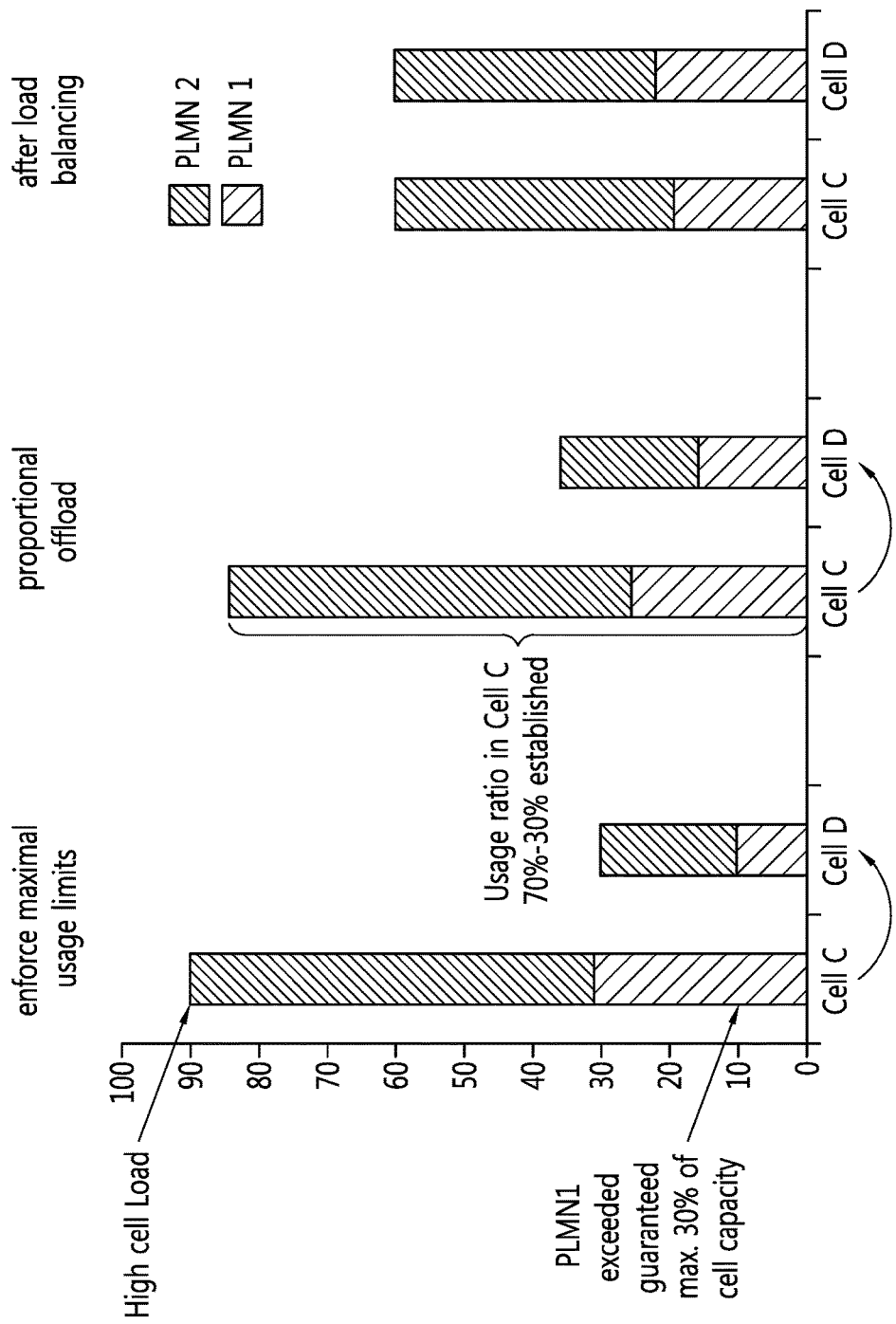
FIG. 5 shows an example of service flows for load balancing in shared RAN.

FIG. 5 shows an example of service flows for load balancing in shared RAN. FIG. 5 corresponds to service flows of cell C and D in the example described above. Initially, cell C has high cell load (90%), and the ratio of operator 1 exceeds the maximum guaranteed ratio of cell capacity (30%). Maximal usage limits has to be enforced to operator 1, and accordingly, traffic from operator 1 is handed over to cell D. Thereafter, traffic from operator 1 and operator 2 is offloaded to cell D proportionally.

Load status of cells and usage per PLMN after load balancing (under optimal conditions) may be as follows.

Cell A is 40% loaded: 31% used by operator 1/9% used by operator 2
Cell B is 50% loaded: 20% used by operator 1/30% used by operator 2
Cell C is 60% loaded: 19% used by operator 1/41% used by operator 2
Cell D is 60% loaded: 22% used by operator 1/38% used by operator 2

The system shall be able to support load balancing within a shared RAN while respecting the agreed shares of RAN resources based on the whole cell load level and the load level for each operator. When load levels, defined by the hosting RAN provider, of individual cells are exceeded, the 3GPP system shall be able to enforce agreed maximal usage limits of each sharing operator and to reduce the total load of the cell by, e.g., preferably handing over UEs to neighbouring cells if possible.

The RAN sharing architecture shall allow different core network operators to connect to a shared radio access network. The operators do not only share the radio network elements, but may also share the radio resources themselves. In addition to this shared radio access network, the operators may or may not have additional dedicated radio access networks, like for example, 2G radio access networks.

There are two identified architectures to be supported by RAN sharing. In both architectures, the radio access network is shared. First architecture is a gateway core network (GWCN). In the GWCN, besides shared radio access network nodes, the core network operators also share core network nodes. That is, mobility management entities (MMEs) serving the shared radio access network nodes are also shared. Second architecture is a multi-operator core network (MOCN). In the MOCN, only the radio access network is shared. The core network nodes are operated by different operators.

Figure 6:
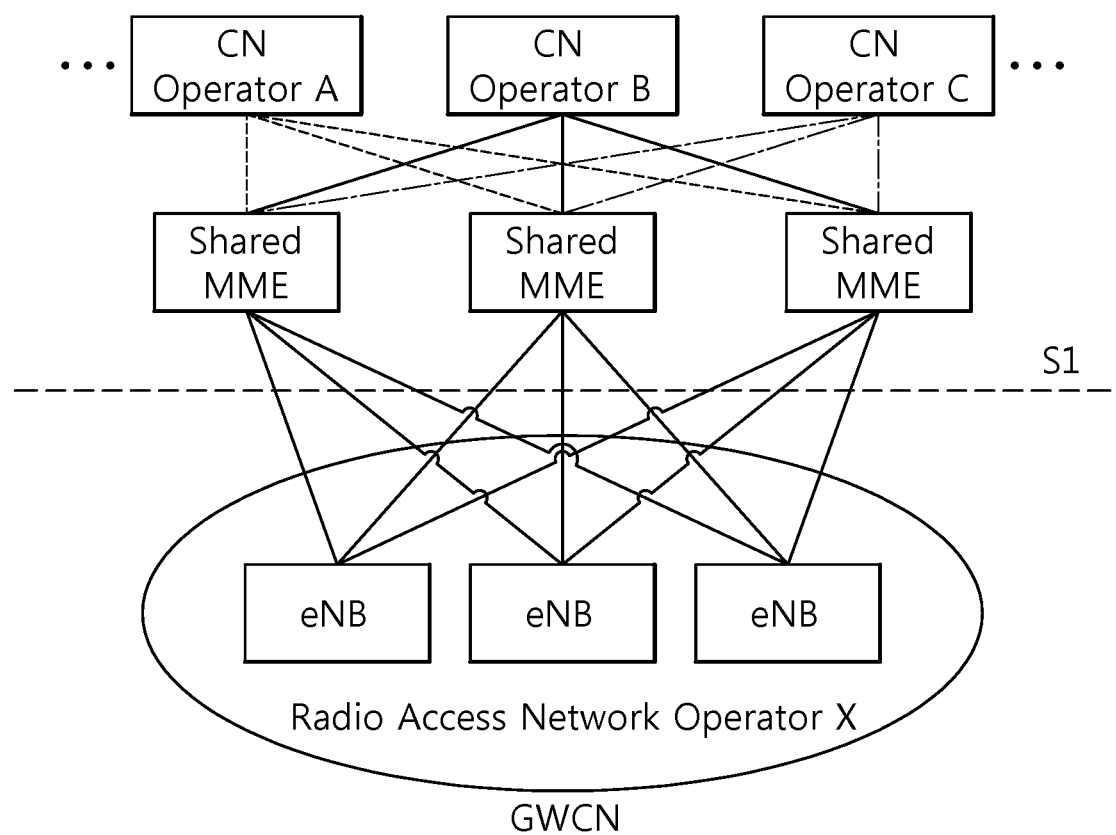
FIG. 6 shows an example of GWCN architecture.

FIG. 6 shows an example of GWCN architecture. Referring to FIG. 6, core network operator A, B, and C shares a plurality of eNBs and a plurality of MMEs serving the plurality of eNBs.

Figure 7:
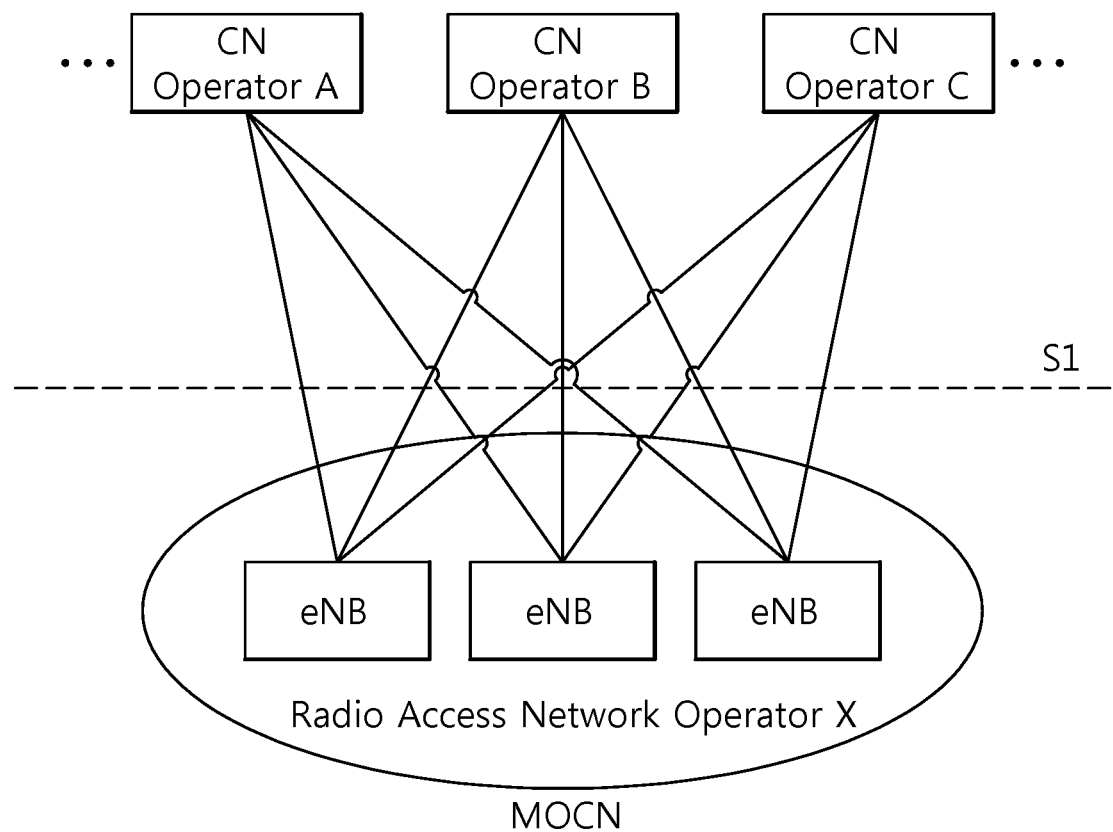
FIG. 7 shows an example of MOCN architecture.

FIG. 7 shows an example of MOCN architecture. Referring to FIG. 7, core network operator A, B, and C shares only a plurality of eNBs.

For supporting the network architecture described above in FIGS. 6 and 7, several problems may exist.

1) For the current MME overload procedures, if the MME sends the message to the eNB, it will apply to all of the UEs served or to be served by the eNB. However, in the RAN sharing environment, specifically for the GWCN-based architecture, some situation may happen that for a specific operator the number of UEs in the sharing RAN network is still under control based on the policy. In this situation, the overload should not apply to the UEs of this operator. It should only apply to the UEs of overloaded operators, which has used more resources than the negotiated policy allows. The current overload procedure does not support it either. Therefore, it is necessary to enhance the overload start/stop messages for supporting the required new feature.

2) Current load balancing procedure among cells supports only one operator. The resource status request/response/update procedures do not report the status per operator, and therefore, the eNB adjusts the mobility setting parameters for all of the UEs without considering whether they belong to the same operator or not. However, in the RAN sharing situation, the current load balancing procedure may not be fair to some operator. Based on the negotiated policy among the operators, the mobility setting parameters may not need to be changed because the number of UEs for that operator is still under control, while for the other operator, the change may be necessary. The current load balancing procedure cannot support the use case described above. Therefore, it is necessary to enhance the corresponding resource status request/response/update messages and also the mobility change request/ACK messages.

3) The initiated setup procedures like X2 setup procedure and S1 setup procedure does not fully support the RAN sharing yet. Accordingly, it is necessary to enhance the initiated setup procedure.

In order to solve the problems described above, various procedures according to embodiments of the present invention are described below.

Figure 8:
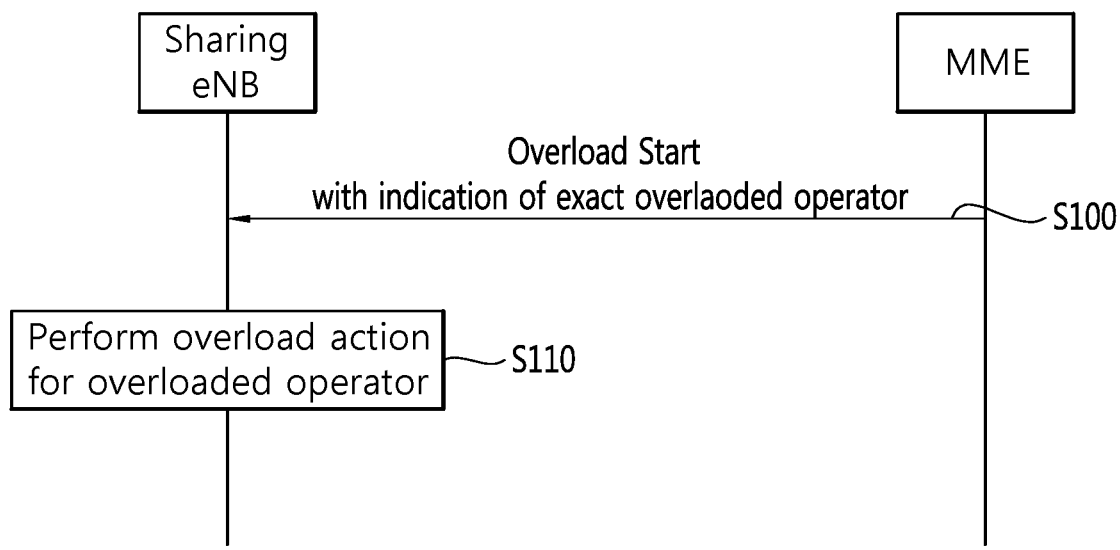
FIG. 8 shows an example of an overload start procedure according to an embodiment of the present invention.

FIG. 8 shows an example of an overload start procedure according to an embodiment of the present invention.

When an MME decides to transmit an overload message to a sharing eNB, in step S100, the MME, which is shared by a plurality of operators, transmits an overload start message including an indication of exact overloaded operator to the sharing eNB, which is shared by the plurality of operators. The indication of exact overloaded operator indicates which operator is overloaded. The indication of exact overloaded operator indicates which PLMN is overloaded.

Table 1 and 2 shows an example of the overload start message according to an embodiment of the present invention. The overload start message is sent by the MME and is used to indicate to the eNB that the MME is overloaded.

TABLE 1

| IE/Group Name | Presence | Range | IE type and reference | Semantics description | Criticality | Assigned Criticality |
|---|---|---|---|---|---|---|
| Message Type | M | | 9.2.1.1 | | YES | ignore |
| Overload Response | M | | 9.2.3.19 | | YES | reject |
| > PLMN ID(s) | O | | | | | |

TABLE 1-continued

| IE/Group Name | Presence | Range | IE type and reference | Semantics description | Criticality | Assigned Criticality |
|---|---|---|---|---|---|---|
| GUMMEI List | | 0 . . . 1 | | | YES | ignore |
| >GUMMEI List Item | | 1 . . . <maxnoofMMECs> | | | EACH | ignore |
| >>GUMMEI | M | | 9.2.3.9 | | — | |
| Traffic Load Reduction Indication | O | | 9.2.3.36 | | YES | ignore |

TABLE 2

| Range bound | Explanation |
|---|---|
| maxnoofMMECs | Maximum no. of MMECs per node per RAT. Value is 256. |

Referring to Table 1, the overload start message includes "PLMN ID(s)" information element (IE), which indicates overloaded PLMN or operator.

In step S110, the sharing eNB performs the overload action for the overloaded operator only, which is indicated by the indication of exact overloaded operator. The overload action may include rejecting RRC connection establishments for non-emergency mobile-originating (MO) direct tunnel (DT), rejecting RRC connection establishments for signaling, permitting emergency sessions and mobile terminated services only, permitting high priority sessions and mobile terminated services only, rejecting delay tolerant access, etc.

Figure 9:
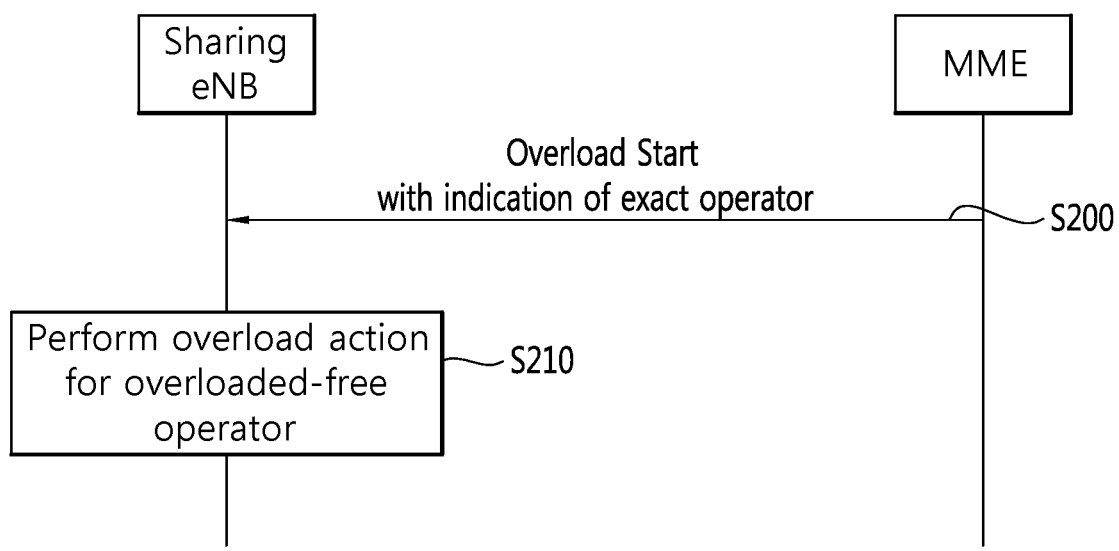
FIG. 9 shows an example of overload stop procedure according to an embodiment of the present invention.

FIG. 9 shows an example of overload stop procedure according to an embodiment of the present invention.

When an MME decides to transmit an overload stop message to a sharing eNB, in step S200, the MME, which is shared by a plurality of operators, transmits an overload stop message including an indication of exact operator to the sharing eNB, which is shared by the plurality of operators. The indication of exact operator indicates which operator is not overloaded now. The indication of exact operator indicates which PLMN is not overloaded now.

Table 3 and 4 shows an example of the overload stop message according to an embodiment of the present invention. The overload stop message is sent by the MME and is used to indicate that the MME is no longer overloaded.

Referring to Table 3, the overload stop message includes "PLMN ID(s)" field, which indicates overload-free PLMN or operator.

In step S210, the sharing eNB performs the overload action for the overload-free operator only, which is indicated by the indication of exact operator.

Figure 10:
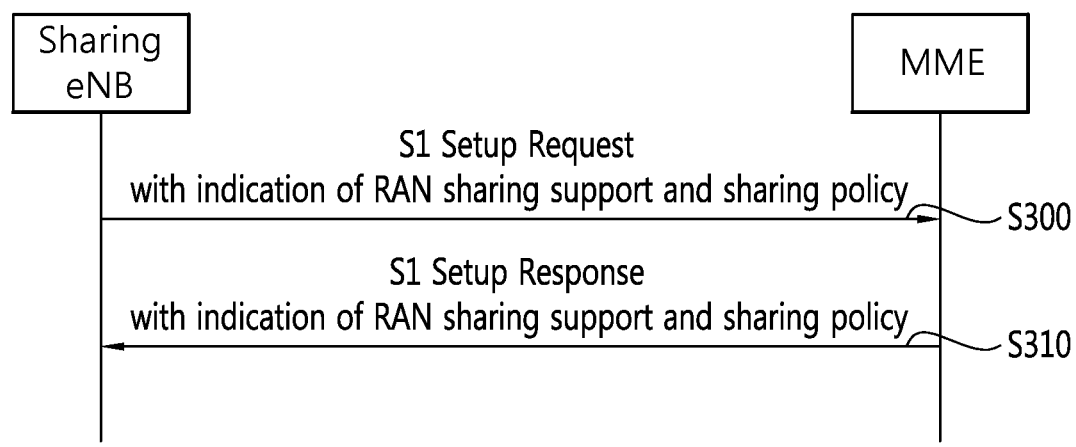
FIG. 10 shows an example of an S1 setup procedure according to an embodiment of the present invention.

FIG. 10 shows an example of an S1 setup procedure according to an embodiment of the present invention.

When S1 interface is setup between the sharing eNB and MME, in step S300, the sharing eNB transmits an S1 setup request message including an indication of RAN sharing support and sharing policy to the MME. The indication of RAN sharing support may be included in the S1 setup request message as a new IE. The sharing policy may be the negotiated portion of resource usage for a specific operator. Further, the sharing policy itself may be the indication of RAN sharing support.

In step S310, the MME transmits an S1 setup response message including an indication of RAN sharing support and sharing policy to the sharing eNB. The indication of RAN sharing support may be included in the S1 setup response message as a new IE. The sharing policy may be the negotiated portion of resource usage for a specific operator. Further, the sharing policy itself may be the indication of RAN sharing support.

Figure 11:
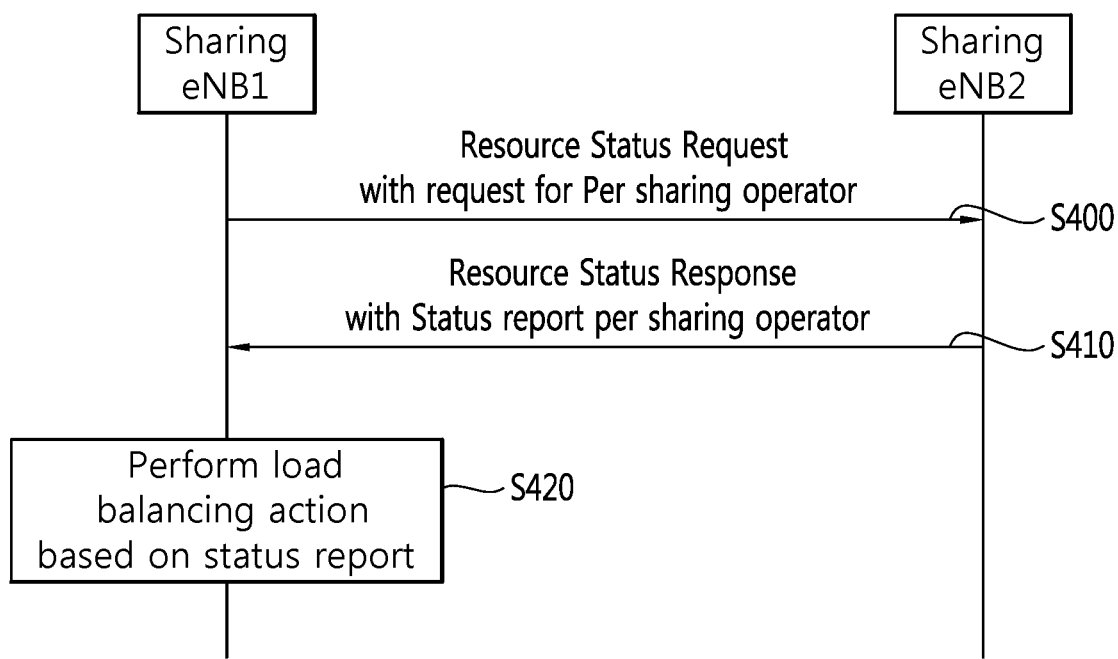
FIG. 11 shows an example of a resource status reporting initiating procedure according to an embodiment of the present invention.

FIG. 11 shows an example of a resource status reporting initiating procedure according to an embodiment of the present invention.

When resource status is necessary to obtain, in step S400, a sharing eNB1, which is shared by a plurality of operators, transmits a resource status request message which includes an indication of requesting status per sharing operator, to a sharing eNB2, which is also shared by the plurality of operators.

TABLE 3

| IE/Group Name | Presence | Range | IE type and reference | Semantics description | Criticality | Assigned Criticality |
|---|---|---|---|---|---|---|
| Message Type | M | | 9.2.1.1 | | YES | reject |
| PLMN ID(s) | O | | | | | |
| GUMMEI List | | 0 . . . 1 | | | YES | ignore |
| >GUMMEI List Item | | 1 . . . <maxnoofMMECs> | | | EACH | ignore |
| >>GUMMEI | M | | 9.2.3.9 | | — | |

TABLE 4

| Range bound | Explanation |
|---|---|
| maxnoofMMECs | Maximum no. of MMECs per node per RAT. Value is 256. |

Table 5, Table 6 and Table 7 show an example of the resource status request message according to an embodiment of the present invention. The resource status request message is sent by an eNB1 to neighboring eNB2 to initiate the requested measurement according to the parameters given in the message.

TABLE 5

| IE/Group Name | Presence | Range | IE type and reference | Semantics description | Criticality | Assigned Criticality |
|---|---|---|---|---|---|---|
| Message Type | M | | 9.2.13 | | YES | reject |
| eNB1 Measurement ID | M | | INTEGER (1 ... 4095, ...) | Allocated by $eNB_1$ | YES | reject |
| eNB2 Measurement ID | C-ifRegistrationRequestStop | | INTEGER (1 ... 4095, ...) | Allocated by $eNB_2$ | YES | ignore |
| Registration Request | M | | ENUMERATED (start, stop, ...) | A value set to "stop", indicates a request to stop all cells measurements. | YES | reject |
| Report Characteristics | O | | BITSTRING (SIZE(32)) | Each position in the bitmap indicates measurement object the $eNB_2$ is requested to report. First Bit = PRB Periodic, Second Bit = TNL load Ind Periodic, Third Bit = HW Load Ind Periodic, Fourth Bit = Composite Available Capacity Periodic, Fifth Bit = ABS Status Periodic. Other bits shall be ignored by the $eNB_2$. | YES | reject |
| Cell To Report | | 1 | | Cell ID list for which measurement is needed | YES | ignore |
| >Cell To Report Item | | 1 ... <maxCellineNB> | | | EACH | ignore |
| >>Cell ID | M | | ECGI 9.2.14 | | — | — |
| Reporting Periodicity | O | | ENUMERATED (1000 ms, 2000 ms, 5000 ms, 10000 ms, ...) | | YES | ignore |
| Partial Success Indicator | O | | ENUMERATED (partial success allowed, ...) | Included if partial success is allowed | YES | ignore |
| indication of requesting the status per sharing operator | O | | | | | |

TABLE 6

| Range bound | Explanation |
|---|---|
| maxCellineNB | Maximum no. cells that can be served by an eNB. Value is 256. |

TABLE 7

| Condition | Explanation |
|---|---|
| ifRegistrationRequestStop | This IE shall be present if the Registration Request IE is set to the value "stop". |

Referring to Table 5, the resource status request message includes "indication of requesting the status per sharing operator" IE.

In step S410, the sharing eNB2 transmits a resource status response message which includes status report per sharing operator to the sharing eNB1. The status report per sharing operator may include at least one of radio resource status per operator, S1 transport network layer (TNL) load indicator per operator if necessary, or composite available capacity group per operator if necessary.

Table 8 and Table 9 show an example of the resource status response message according to an embodiment of the present invention. The resource status response message is sent by the eNB2 to indicate that the requested measurement, for all or for a subset of the measurement objects included in the measurement is successfully initiated.

TABLE 8

| IE/Group Name | Presence | Range | IE type and reference | Semantics description | Criticality | Assigned Criticality |
|---|---|---|---|---|---|---|
| Message Type | M | | 9.2.13 | | YES | reject |
| eNB1 Measurement ID | M | | INTEGER (1 . . . 4095, . . . ) | Allocated by $eNB_1$ | YES | reject |
| eNB2 Measurement ID | M | | INTEGER (1 . . . 4095, . . . ) | Allocated by $eNB_2$ | YES | reject |
| Criticality Diagnostics | O | | 9.2.7 | | YES | ignore |
| Measurement Initiation Result | | 0 . . . 1 | | List of all cells in which measurement objects were requested, included when indicating partial success | YES | ignore |
| >Measurement Initiation Result Item | | 1 . . . <maxCellineNB> | | | EACH | ignore |
| >>Cell ID | M | | ECGI 9.2.14 | | — | — |
| >> PLMN | O | 1 . . . <maxSharingPLMNs> | | | | |
| >>>Hardware Load Indicator | O | | 9.2.34 | | | |
| >>>S1 TNL Load Indicator | O | | 9.2.35 | | | |
| >>>Radio Resource Status | O | | 9.2.37 | | | |
| >>>Composite Available Capacity Group | O | | 9.2.44 | | YES | ignore |
| >>Measurement Failure Cause List | | 0 . . . 1 | | Indicates that $eNB_2$ could not initiate the measurement for at least one of the requested measurement objects in the cell | — | — |
| >>>Measurement Failure Cause Item | | 1 . . . <maxFailedMeasObjects> | | | EACH | ignore |
| >>>>Measurement Failed Report Characteristics | M | | BITSTRING (SIZE(32)) | Each position in the bitmap indicates measurement object that failed to be initiated in the $eNB_2$. First Bit = PRB Periodic, Second Bit = TNL load Ind Periodic, Third Bit = HW Load Ind Periodic, Fourth Bit = Composite Available Capacity Periodic, Fifth Bit = ABS Status Periodic. Other bits shall be ignored by the $eNB_1$. | — | — |
| >>>>Cause | M | | 9.2.6 | Failure cause for measurement objects for which the measurement cannot be initiated | — | — |

TABLE 9

| Range bound | Explanation |
| --- | --- |
| maxFailedMeasObjects | Maximum number of measurement objects that can fail per measurement. Value is 32. |
| maxCellineNB | Maximum no. cells that can be served by an eNB. Value is 256. |

Referring to Table 8, the resource status response message includes "PLMN" IE, which indicates each sharing operator. Further, the resource status response message includes status report per sharing operator, such as "Hardware Load Indicator" IE, "S1 TNL Load Indicator" IE, "Radio Resource Status" IE, "Composite Available Capacity Group" IE.

In step S420, the sharing eNB1 performs the load balancing action based on the status report.

Figure 12:
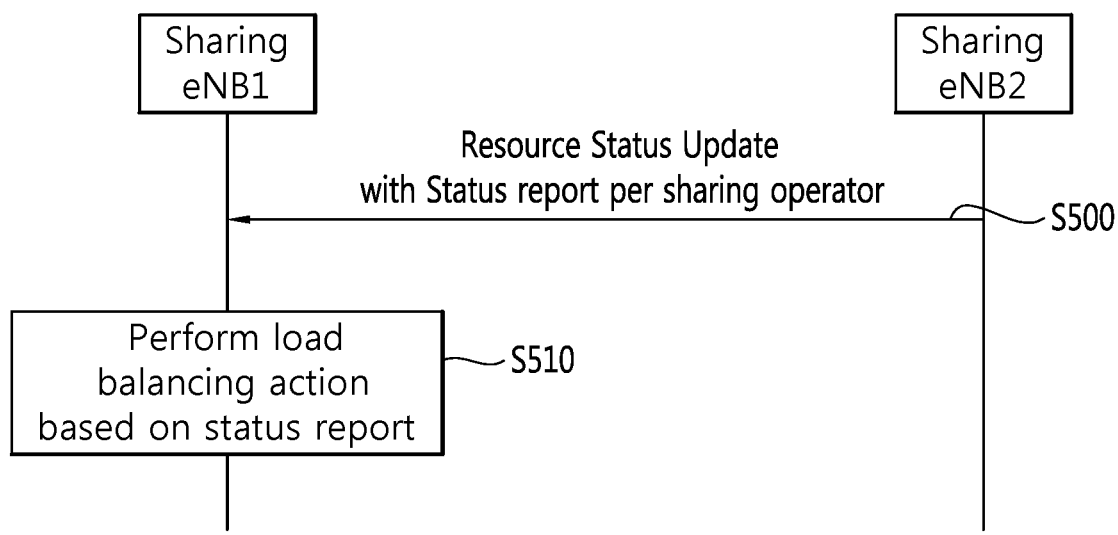
FIG. 12 shows an example of a resource status reporting procedure according to an embodiment of the present invention.

FIG. 12 shows an example of a resource status reporting procedure according to an embodiment of the present invention.

In step S500, a sharing eNB2, which is shared by a plurality of operators, transmits a resource status update message which includes status report per sharing operator to a sharing eNB1, which is also shared by the plurality of operators. The status report per sharing operator may include at least one of radio resource status per operator, S1 TNL load indicator per operator if necessary, or composite available capacity group per operator if necessary.

Table 10 and Table 11 show an example of the resource status update message according to an embodiment of the present invention. The resource status response message is sent by eNB2 to neighboring eNB1 to report the results of the requested measurements.

includes status report per sharing operator, such as "Hardware Load Indicator" IE, "S1 TNL Load Indicator" IE, "Radio Resource Status" IE, "Composite Available Capacity Group" IE.

In step S510, the sharing eNB1 performs the load balancing action based on the status report.

When the status report per sharing operator is provided from the sharing eNB2 via the resource status response message or resource status update message, a mobility setting change procedure may be followed for the load balancing action. The mobility setting change procedure enables an eNB to negotiate the handover trigger settings with a peer eNB controlling neighboring cells.

Figure 13:
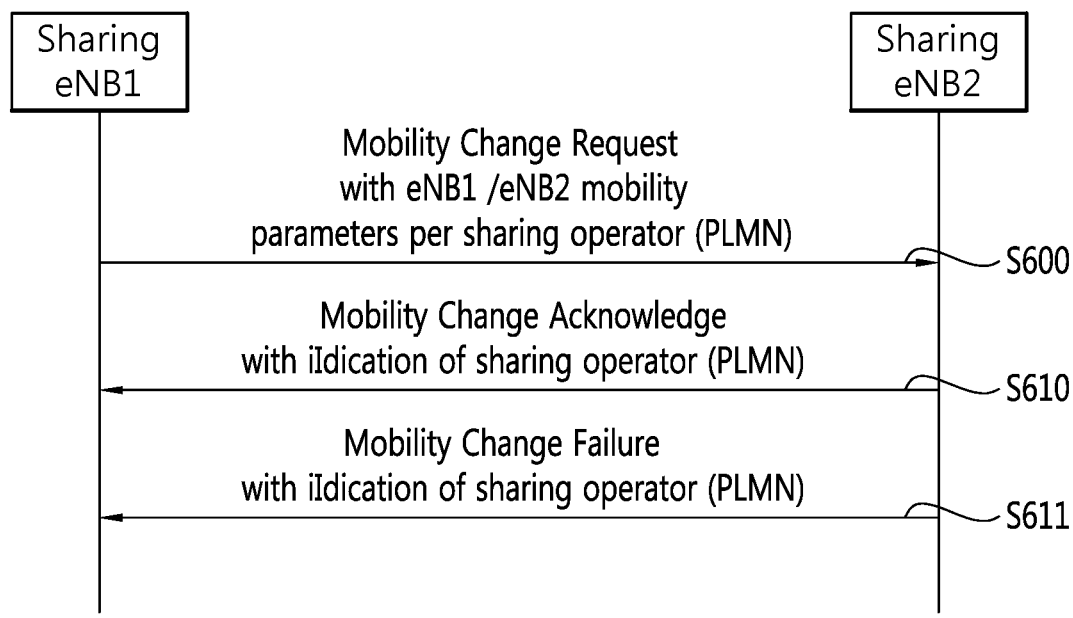
FIG. 13 shows an example of a mobility setting change procedure according to an embodiment of the present invention.

FIG. 13 shows an example of a mobility setting change procedure according to an embodiment of the present invention. In step S600, the sharing eNB1 transmits a mobility change request message to the sharing eNB2. The mobility change request message may include mobility parameters of the sharing eNB1/eNB2 per sharing operator, i.e., PLMN. In step S610, the sharing eNB2 may transmit a mobility change acknowledge message to the sharing eNB1, or in step S611, the sharing eNB may transmit a mobility change failure message to the sharing eNB1. The mobility change acknowledge message or the mobility change failure message may include an indication of sharing operator, i.e., PLMN.

Figure 14:
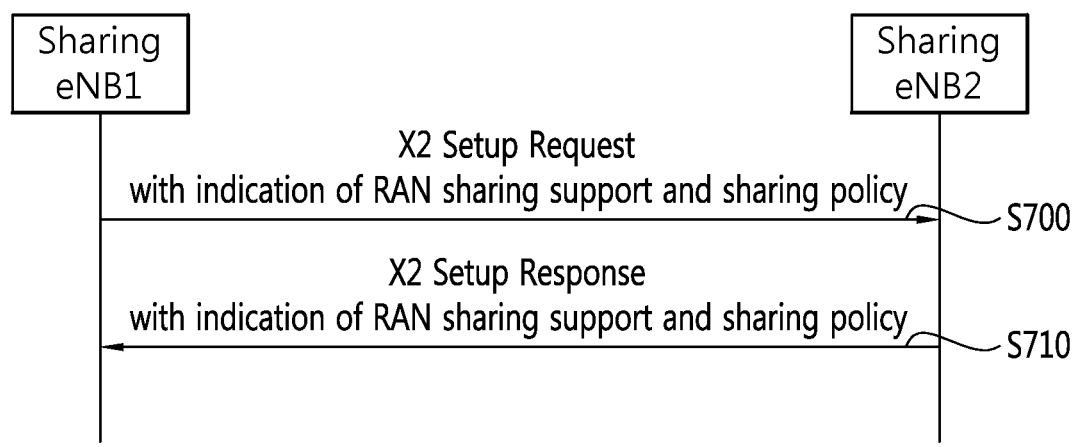
FIG. 14 shows an example of an X2 setup procedure according to an embodiment of the present invention.

FIG. 14 shows an example of an X2 setup procedure according to an embodiment of the present invention.

When X2 interface is setup between eNBs, in step S700, a sharing eNB1, which is shared by a plurality of operators, transmits an X2 setup request message including an indication of RAN sharing support and sharing policy to a sharing eNB2. The indication of RAN sharing support may be

TABLE 10

| IE/Group Name | Presence | Range | IE type and reference | Semantics description | Criticality | Assigned Criticality |
| --- | --- | --- | --- | --- | --- | --- |
| Message Type | M | | 9.2.13 | | YES | ignore |
| eNB1 Measurement ID | M | | INTEGER (1 ... 4095, ... ) | Allocated by eNB$_1$ | YES | reject |
| eNB2 Measurement ID | M | | INTEGER (1 ... 4095, ... ) | Allocated by eNB$_2$ | YES | reject |
| Cell Measurement Result | | 1 | | | YES | ignore |
| >Cell Measurement Result Item | | 1 ... <maxCellineNB> | | | EACH | ignore |
| >>Cell ID | M | | ECGI 9.2.14 | | | |
| >> PLMN | O | 1 ... <maxSharingPLMNs> | | | | |
| >>>Hardware Load Indicator | O | | 9.2.34 | | | |
| >>>S1 TNL Load Indicator | O | | 9.2.35 | | | |
| >>>Radio Resource Status | O | | 9.2.37 | | | |
| >>>Composite Available Capacity Group | O | | 9.2.44 | | YES | ignore |
| >>ABS Status | O | | 9.2.58 | | YES | ignore |

TABLE 11

| Range bound | Explanation |
| --- | --- |
| maxCellineNB | Maximum no. cells that can be served by an eNB. Value is 256. |

Referring to Table 10, the resource status response message includes "PLMN" IE, which indicates each sharing operator. Further, the resource status response message included in the X2 setup request message as a new IE. The sharing policy may be the negotiated portion of resource usage for a specific operator. Further, the sharing policy itself may be the indication of RAN sharing support.

Table 12 shows an example of the X2 setup request message according to an embodiment of the present invention. The X2 setup request message is sent by an eNB to a neighboring eNB to transfer the initialization information for a TNL association.

TABLE 12

| IE/Group Name | Presence | Range | IE type and reference | Semantics description | Criticality | Assigned Criticality |
|---|---|---|---|---|---|---|
| Message Type | M | | 9.2.13 | | YES | reject |
| Global eNB ID | M | | 9.2.22 | | YES | reject |
| Served Cells | | 1 ... <maxCellineNB> | | Complete list of cells served by the eNB | YES | reject |
| >Served Cell Information | M | | 9.2.8 | | — | — |
| >Neighbour Information | | 0 ... <maxnoofNeighbours> | | | — | — |
| >>ECGI | M | | ECGI 9.2.14 | E-UTRAN Cell Global Identifier of the neighbour cell | — | — |
| >>PCI | M | | INTEGER (0 ... 503, ... ) | Physical Cell Identifier of the neighbour cell | — | — |
| >>EARFCN | M | | 9.2.26 | DL EARFCN for FDD or EARFCN for TDD | — | — |
| >>TAC | O | | OCTET STRING (2) | Tracking Area Code | YES | ignore |
| >>EARFCN Extension | O | | 9.2.65 | DL EARFCN for FDD or EARFCN for TDD. If this IE is present, the value signalled in the EARFCN IE is ignored. | YES | reject |
| GU Group Id List | | 0 ... <maxfPools> | | List of all the pools to which the eNB belongs | GLOBAL | reject |
| >GU Group Id | M | | 9.2.20 | | — | — |

Referring to Table 12, the X2 setup request message includes "Served Cell Information" IE. Table 13 and Table 14 show an example of the "Served Cell Information IE" according to an embodiment of the present invention. This IE contains cell configuration information of a cell that a neighbor eNB may need for the X2 AP interface.

TABLE 13

| IE/Group Name | Presence | Range | IE type and reference | Semantics description | Criticality | Assigned Criticality |
|---|---|---|---|---|---|---|
| PCI | M | | INTEGER (0 ... 503, ... ) | Physical Cell ID | — | — |
| Cell ID | M | | ECGI 9.2.14 | | — | — |
| TAC | M | | OCTET STRING (2) | Tracking Area Code | — | — |
| Broadcast PLMNs | | 1 ... <maxnoofBPLMNs> | | Broadcast PLMNs | — | — |
| >PLMN Identity | M | | 9.2.4 | | | |
| >>Sharing portion of the PLMN | O | | | | | |
| CHOICE EUTRA-Mode-Info | M | | | | — | — |
| >FDD | | | | | | |

TABLE 13-continued

| IE/Group Name | Presence | Range | IE type and reference | Semantics description | Criticality | Assigned Criticality |
|---|---|---|---|---|---|---|
| >>FDD Info | | 1 | | | — | — |
| >>>UL EARFCN | M | | EARFCN 9.2.26 | Corresponds to $N_{UL}$ in TS 36.104 [16] for E-UTRA operating bands for which it is defined; ignored for E-UTRA operating bands for which $N_{UL}$ is not defined | — | — |
| >>>DL EARFCN | M | | EARFCN 9.2.26 | Corresponds to $N_{DL}$ in TS 36.104 [16] | — | — |
| >>>UL Transmission Bandwidth | M | | Transmission Bandwidth 9.2.27 | Same as DL Transmission Bandwidth in this release; ignored in case UL EARFCN value is ignored | — | — |
| >>>DL Transmission Bandwidth | M | | Transmission Bandwidth 9.2.27 | | — | — |
| >>>UL EARFCN Extension | O | | EARFCN Extension 9.2.65 | If this IE is present, the value signalled in the UL EARFCN IE is ignored. | YES | reject |
| >>>DL EARFCN Extension | O | | EARFCN Extension 9.2.65 | If this IE is present, the value signalled in the DL EARFCN IE is ignored. | YES | reject |
| >TDD | | | | | — | — |
| >>TDD Info | | 1 | | | — | — |
| >>>EARFCN | M | | 9.2.26 | Corresponds to $N_{DL}/N_{UL}$ in TS 36.104 [16] | — | — |
| >>>Transmission Bandwidth | M | | Transmission Bandwidth 9.2.27 | | — | — |
| >>>Subframe Assignment | M | | ENUMERATED (sa0, sa1, sa2, sa3, sa4, sa5, sa6, . . . ) | Uplink-downlink subframe configuration information defined in TS 36.211 [10] | — | — |
| >>>Special Subframe Info | | 1 | | Special subframe configuration information defined in TS 36.211 [10] | — | — |
| >>>>Special Subframe Patterns | M | | ENUMERATED (ssp0, ssp1, ssp2, ssp3, ssp4, ssp5, ssp6, ssp7, ssp8, . . . ) | | — | — |
| >>EARFCN Extension | O | | 9.2.65 | If this IE is present, the value signalled in the EARFCN IE is ignored. | YES | reject |

TABLE 13-continued

| IE/Group Name | Presence | Range | IE type and reference | Semantics description | Criticality | Assigned Criticality |
|---|---|---|---|---|---|---|
| >>>>Cyclic Prefix DL | M | | ENUMERATED (Normal, Extended, . . . ) | | — | — |
| >>>>Cyclic Prefix UL | M | | ENUMERATED (Normal, Extended, . . . ) | | — | — |
| >>>Additional Special Subframe Info | O | | | Special subframe configuration information defined in TS 36.211 [10]. Only for newly defined configuration of special subframe from Release 11. | GLOBAL | ignore |
| >>>>Additional Special Subframe Patterns | M | | ENUMERATED (ssp0, ssp1, ssp2, ssp3, ssp4, ssp5, ssp6, ssp7, ssp8, ssp9, . . . ) | | — | — |
| >>>>Cyclic Prefix DL | M | | ENUMERATED (Normal, Extended, . . . ) | | — | — |
| >>>>Cyclic Prefix UL | M | | ENUMERATED (Normal, Extended, . . . ) | | — | — |
| Number of Antenna Ports | O | | 9.2.43 | | YES | ignore |
| PRACH Configuration | O | | PRACH Configuration 9.2.50 | | YES | ignore |
| MBSFN Subframe Info | | 0 . . . <maxnoofMBSFN> | | MBSFN subframe defined in TS 36.331 [9] | GLOBAL | ignore |
| >Radioframe Allocation Period | M | | ENUMERATED (n1, n2, n4, n8, n16, n32, . . . ) | | — | — |
| >Radioframe Allocation Offset | M | | INTEGER (0 . . . 7, . . . ) | | — | — |
| >Subframe Allocation | M | | 9.2.51 | | — | — |
| CSG ID | O | | 9.2.53 | | YES | ignore |
| MBMS Service Area Identity List | | 0 . . . <maxnoofMBMSServiceAreaIdentities> | | Supported MBMS Service Area Identities in the cell | GLOBAL | ignore |
| >MBMS Service Area Identity | | | OCTET STRING (2) | MBMS Service Area Identities as defined in TS 23.003 [29] | | |
| RAN Sharing support | O | | | | | |
| MultibandInfoList | O | | 9.2.60 | | YES | ignore |

TABLE 14

| Range bound | Explanation |
| --- | --- |
| maxnoofBPLMNs | Maximum no. of Broadcast PLMN Ids. Value is 6. |
| maxnoofMBSFN | Maximum no. of MBSFN frame allocation with different offset. Value is 8. |
| maxnoofMBMSServiceAreaIdentities | Maximum no. of MBMS Service Area Identities. Value is 256. |

Referring to Table 13, the "Served Cell Information IE" includes "Sharing portion of the PLMN" IE and "RAN Sharing support" IE.

In step S710, the sharing eNB2 transmits an X2 setup response message including an indication of RAN sharing support and sharing policy to the sharing eNB. The indication of RAN sharing support may be included in the X2 setup response message as a new IE. The sharing policy may be the negotiated portion of resource usage for a specific operator. Further, the sharing policy itself may be the indication of RAN sharing support.

Accordingly, the sharing eNB1 and eNB2 ma take action based on the received parameters.

Figure 15:
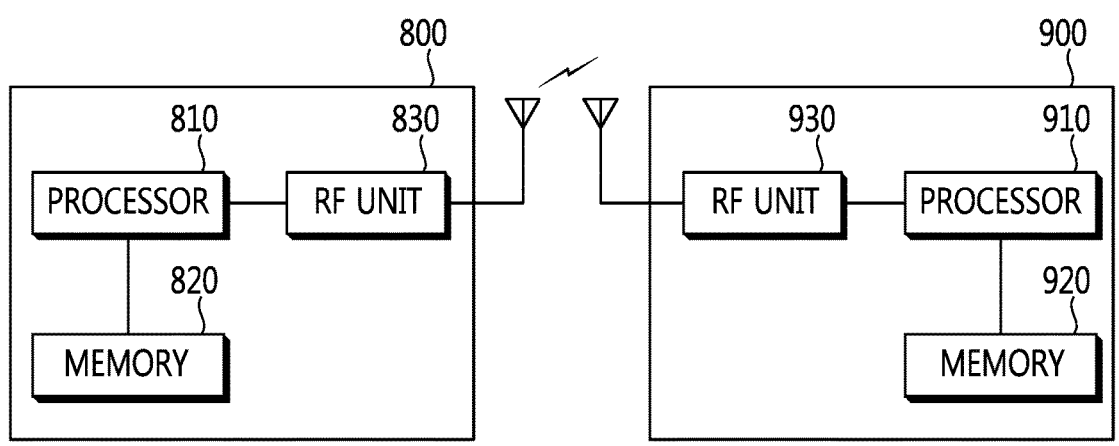
FIG. 15 shows a wireless communication system to implement an embodiment of the present invention.

FIG. 15 shows a wireless communication system to implement an embodiment of the present invention.

A first eNB 800 includes a processor 810, a memory 820, and a radio frequency (RF) unit 830. The processor 810 may be configured to implement proposed functions, procedures, and/or methods in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A second eNB or MME 900 includes a processor 910, a memory 920 and an RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for performing, by a first evolved NodeB (eNB) which is shared by a plurality of operators, a load balancing procedure in a wireless communication system, the method comprising:
transmitting a status report requesting message to a second eNB, which is shared by the plurality of operators;
receiving a status report per sharing operator from the second eNB; and
performing a load balancing action based on the status report and a resource sharing portion of a public land mobile network (PLMN) per eNB,
wherein the status report requesting message includes an information element (IE) for requesting the status per sharing operator,
wherein the status report per sharing operator includes:
a radio resource status per sharing operator,
an S1 transport network layer (TNL) load information per sharing operator, and
a composite available capacity group per sharing operator, and
wherein an X2 interface between the first eNB and the second eNB is set up based on the resource sharing portion of PLMN per eNB.

2. The method of claim 1, wherein the status report per operator includes a public land mobile network (PLMN) per operator.

3. The method of claim 1, wherein the status report per operator is received via a resource status response message.

4. The method of claim 3, wherein the indication is transmitted via a resource status request message.

5. The method of claim 1, wherein the status report per operator is received via a resource status update message.

6. The method of claim 1, wherein the load balancing action comprises transmitting a mobility change request message including mobility parameters of the first eNB and the second eNB per operator.

7. The method of claim 1, wherein the X2 interface is set up based further on a sharing policy.

8. The method of claim 7, wherein the sharing policy includes a negotiated portion of resource usage for a specific operator.

9. The method of claim 1, wherein the RAN sharing support is included in an X2 setup request message and an X2 setup response message.

10. The method of claim 1, wherein an IE Served Cell Information includes an information element of the resource sharing portion of the PLMN.

11. The method of claim 1, wherein, after performing the load balancing action, the UE performs a mobility setting change procedure.

12. The method of claim 11, wherein the first eNB transmits a mobility change request message including mobility parameters of the first eNB per sharing operator, when performing the mobility setting change procedure.

* * * * *